(12) United States Patent
Schladow et al.

(10) Patent No.: US 12,659,690 B2
(45) Date of Patent: Jun. 16, 2026

(54) PROXIMITY AND DIRECTION BASED ELECTRONIC DEVICE PAIRING

(71) Applicant: Google LLC, Mountain View, CA (US)

(72) Inventors: Amelia Schladow, Mountain View, CA (US); Philip Dam Roadley-Battin, Mountain View, CA (US); Seth Ryan Benson, Mountain View, CA (US); Matthew Sibigtroth, Mountain View, CA (US); Tyler John Gough, Mountain View, CA (US)

(73) Assignee: Google LLC, Mountain View, CA (US)

( * ) Notice: Subject to any disclaimer, the term of this patent is extended or adjusted under 35 U.S.C. 154(b) by 275 days.

(21) Appl. No.: 18/280,363

(22) PCT Filed: Feb. 4, 2022

(86) PCT No.: PCT/US2022/015278
§ 371 (c)(1),
(2) Date: Sep. 5, 2023

(87) PCT Pub. No.: WO2022/170070
PCT Pub. Date: Aug. 11, 2022

(65) Prior Publication Data
US 2024/0073642 A1 Feb. 29, 2024

Related U.S. Application Data

(60) Provisional application No. 63/146,118, filed on Feb. 5, 2021.

(51) Int. Cl.
*H04W 4/02* (2018.01)
*G01S 3/80* (2006.01)
(Continued)

(52) U.S. Cl.
CPC ............... *H04W 4/023* (2013.01); *G01S 3/80* (2013.01); *G01S 13/0209* (2013.01); *G01S 17/42* (2013.01); *H04W 76/14* (2018.02)

(58) Field of Classification Search
CPC ......... H04W 4/023; H04W 76/14; G01S 3/80; G01S 13/0209; G01S 17/42
See application file for complete search history.

(56) References Cited

U.S. PATENT DOCUMENTS 8,447,070 B1 5/2013 Bozarth et al.
11,159,932 B1 * 10/2021 Meyer .................. G06F 3/0488
(Continued)

FOREIGN PATENT DOCUMENTS

CN 104350730 A 2/2015
JP H10154292 A * 6/1998 ............... G08G 1/01

OTHER PUBLICATIONS

International Search Report and Written Opinion for PCT/US2022/015278 dated May 13, 2022, all pages.
(Continued)

*Primary Examiner* — Erika A Washington
(74) *Attorney, Agent, or Firm* — Lerner David LLP

(57) ABSTRACT

Various arrangements for establishing a link between two electronic devices are presented herein. A pairing mode may be activated to establish the link. A first electronic wireless device can determine that a distance to a second wireless electronic device meets a distance threshold criterion. In response to the pairing mode being activated and the distance to the second wireless electronic device meeting the distance threshold criterion, a graphic element, such as a glow effect, can be presented indicative of direction and distance to the second wireless electronic device.

18 Claims, 12 Drawing Sheets

(51) Int. Cl.
G01S 13/02 (2006.01)
G01S 17/42 (2006.01)
H04W 76/14 (2018.01)

(56)      References Cited

U.S. PATENT DOCUMENTS

| | | |
|---|---|---|
| 2003/0220765 A1 | 11/2003 | Overy et al. |
| 2005/0048987 A1 | 3/2005 | Glass |
| 2009/0058670 A1* | 3/2009 | Sweeney ................ G08B 21/24 |
| | | 340/686.1 |
| 2009/0221298 A1* | 9/2009 | Hanner .................... G01S 3/78 |
| | | 455/456.1 |
| 2013/0225078 A1 | 8/2013 | Johansson et al. |
| 2014/0247346 A1 | 9/2014 | Bozarth et al. |

OTHER PUBLICATIONS

Office Action for Chinese Patent Application No. 202280013015.4 dated Mar. 10, 2026. 8 pages.

* cited by examiner

1200

PROXIMITY AND DIRECTION BASED ELECTRONIC DEVICE PAIRING

CROSS-REFERENCE TO RELATED APPLICATIONS

This application is a 371 National Stage filing of PCT Application No. PCT/US2022/015278, filed Feb. 4, 2022, and titled "PROXIMITY AND DIRECTION BASED ELECTRONIC DEVICE PAIRING," which claims the benefit of, and priority to, U.S. Provisional Application Ser. No. 63/146,118, filed Feb. 5, 2021, and titled "SYSTEMS AND METHODS FOR DISPLAYING PROXIMITY OF AN ELECTRONIC DEVICE, AND ASSOCIATED DEVICES," which are hereby incorporated by reference in their entirety for all purposes.

BACKGROUND

The process of pairing two electronic devices has become fairly common. The typical pairing process involves manually identifying each of the two devices and explicitly confirming that the two devices should be paired. For example, a user can desire to pair wireless headphones with a smartphone. In this example, the user, through an interface on the phone, identifies the headphones by selecting an identifier (e.g., a default or user-assigned name) of the headphones from a list and may also confirm that the two devices are to be paired.

This arrangement can be frustrating to a user if there are a significant number of devices eligible for pairing within range. For example, a user attempting to complete a pairing process while in a conference room or on an airplane may receive an extensive list of devices from which to select the correct device for pairing. This process can be further frustrated by the user not knowing the identifier of the device to be paired and having to guess.

SUMMARY

In some embodiments, a method for establishing a link between two electronic devices is presented. The method can include activating, by a first wireless electronic device, a pairing mode to establish the link. The method can include determining, by the first electronic wireless device, that a distance to a second wireless electronic device meets a distance threshold criterion. The method can include, in response to the pairing mode being activated and the distance to the second wireless electronic device meeting the distance threshold criterion, presenting, via an electronic display of the first wireless electronic device, a graphic element indicative of direction and distance to the second wireless electronic device.

Embodiments of such a method may include one or more of the following features: The method can include activating, by the second wireless electronic device, the pairing mode to establish the link with the first wireless electronic device. The method can include determining, by the second electronic wireless device, that the distance to the first wireless electronic device meets the distance threshold criterion. The method can include, in response to the pairing mode being activated at the second wireless electronic device and the distance to the first wireless electronic device meeting the distance threshold criterion, presenting, via a second electronic display of the second wireless electronic device, a second graphic element indicative of a second direction and a second distance to the first wireless electronic device, such that the second graphical element is presented concurrently with the graphical element presented by the electronic display of the first wireless electronic device. The method can include, while presenting, via the electronic display of the first wireless electronic device, the graphical element indicative of direction and distance to the second wireless electronic device, receiving, by the first wireless electronic device, user input indicative that pairing with the second wireless electronic device is to be performed. The method can include, in response to the user input, pairing, by the first wireless electronic device, with the second wireless electronic device. The graphical element can include a glowing effect indicative of the direction and the distance to the second wireless electronic device. The glowing effect may be presented within only within a defined distance of an edge of the electronic display of the first wireless electronic device. The method can include selecting, by the first wireless electronic device, the second wireless electronic device for pairing while in the pairing mode without user input indicating an identifier of the second wireless electronic device. The method can include updating, by the first electronic wireless device, the graphical element indicative of direction and distance to the second wireless electronic device based on a change in the distance, the direction, or both to the second wireless electronic device. Updating the graphical element indicative of direction and distance to the second wireless electronic device can include altering one or more of the following characteristics of the graphical element: intensity; brightness; size; and color. The method can include measuring, by the first wireless electronic device, the distance to the second wireless electronic device using a method selected from the group consisting of: ultra-wideband (UWB) radar; light detection and ranging (LIDAR); signal strength; and ultrasonic sound. The method can include determining, by the first electronic wireless device, that a second distance to a third wireless electronic device does not meet the distance threshold criterion. The method can include, in response to the pairing mode being activated and the distance to the third wireless electronic device not meeting the distance threshold criterion, presenting, via the electronic display of the first wireless electronic device, a listing of identifiers that includes an identifier of the third wireless electronic device.

In some embodiments, a device or system for pairing electronic devices is presented. For example, a first wireless electronic device may be present. This device can include a housing; an electronic display housed by the housing; a wireless communication interface housed by the housing; and a processing system, comprising one or more processors. The processors can be configured to activate a pairing mode. The processors can be configured to determine that a distance to a second wireless electronic device meets a distance threshold criterion. The processors can be configured to, in response to the pairing mode being activated and the distance to the second wireless electronic device meeting the distance threshold criterion, cause the electronic display to display a graphic element indicative of direction and distance to the second wireless electronic device.

System embodiments can include the second wireless electronic device, which can include a second housing; a second electronic display housed by the second housing; a second wireless communication interface housed by the second housing; and a second processing system, comprising one or more processors. These one or more processors can be configured to activate the pairing mode. These one or more processors can be configured to determine that the distance to the first wireless electronic device meets the distance threshold criterion. These processors can be configured to, in response to the pairing mode being activated at the second wireless electronic device and the distance to the first wireless electronic device meeting the distance threshold criterion, cause the second electronic display to present a second graphic element indicative of direction and distance to the first wireless electronic device, such that the second graphical element is presented concurrently with the graphical element presented by the electronic display of the first wireless electronic device. In some embodiments, the second wireless electronic device does not include an electronic display.

Embodiments of such a system or such a first electronic device can include one or more of the following features: The processing system of the first wireless electronic device can be further configured to, while the graphical element indicative of direction and distance to the second wireless electronic device is being presented, receive user input indicative that pairing with the second wireless electronic device is to be performed. The processing system of the first device can be further configured to, in response to the user input, pair with the second wireless electronic device. The graphical element can be in the form of a glowing effect indicative of the direction and the distance to the second wireless electronic device. The glowing effect may be presented within only a defined distance of an edge of the electronic display of the first wireless electronic device. The processing system of the first device can be further configured to select the second wireless electronic device for pairing while in the pairing mode without user input indicating an identifier of the second wireless electronic device. The processing system of the first device can be further configured to update the graphical element indicative of direction and distance to the second wireless electronic device based on a change in the distance, the direction, or both to the second wireless electronic device. The processing system of the first device can be further configured to update the graphical element indicative of direction and distance to the second wireless electronic device comprises the processing system being configured to alter one or more of the following characteristics of the graphical element: intensity; brightness; size; and color. The processing system of the first device can be further configured to receive the distance to the second wireless electronic device measured using a method selected from the group consisting of: ultra-wideband (UWB) radar; light detection and ranging (LIDAR); signal strength; and ultrasonic sound.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Rather than requiring a user to select a device for pairing from a list, embodiments detailed herein allow for a streamlined process that determines a device for pairing and/or visually indicates the device to which pairing will be performed. A wireless electronic device may be configured to perform a distance measurement to wireless devices available for pairing. A determination may be made of a remote wireless device that has pairing enabled, is closest to the device, and is within a threshold distance. This closest remote device may be assumed to be the device that the user desires to pair with the user's wireless electronic device.

In response to identifying this remote wireless device, a graphical indication is presented on an electronic display of the user's wireless electronic device indicative of the distance and direction to the remote wireless device for pairing. If the remote wireless device also has an electronic display, a similar graphical indication of distance and direction to the user's wireless electronic device can be presented. These graphical indications are dynamic, such that as the devices move in relation to each other, the one or more graphical indications are updated to indicate changes in distance and direction. Without knowing the identifier of the remote wireless device or the user's wireless electronic device, the user can use the one or more graphical indicators to confirm the correct wireless devices are being paired together.

"Pairing," as used herein, can refer to establishing a unidirectional or bidirectional data link between two electronic devices. For example, for two devices to communicate via Bluetooth or some other direct short-range communication protocol, the two devices first need to be paired. This pairing process is a form of information registration that allows devices to exchange necessary information about each other, including encryption, capabilities, identifiers, etc. "Pairing," as used herein, can also refer to ad hoc data exchanges, such as data or file transfers or triggering a device to output media. For example, the pairing process detailed herein can be used to set which device is to output a piece of media.

Further, embodiments detailed herein can be used in situations when pairing is not going to be performed. Rather, in certain circumstances, knowing the distance and direction to another wireless electronic device may be useful for other purposes; therefore, the embodiments detailed herein can also be used in these situations without the pairing aspects. For example, arrangements detailed herein can help with locating a lost device. Another arrangement could involve identifying a remote electronic device for some other person, such as granting permission to access an account.

Figure 1:
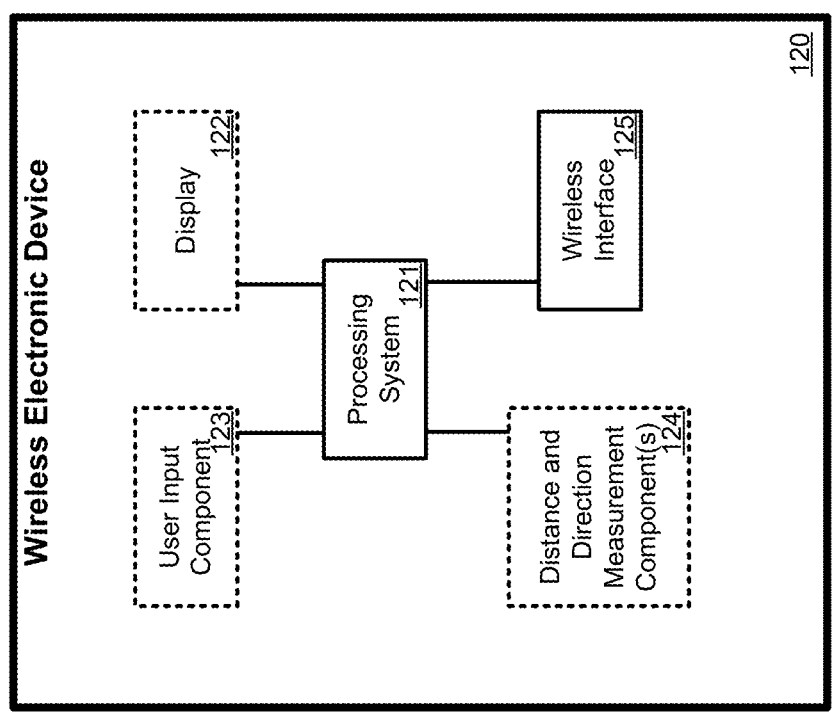
FIG. 1 illustrates an embodiment of a system of electronic devices that can be paired.
Figure 1:
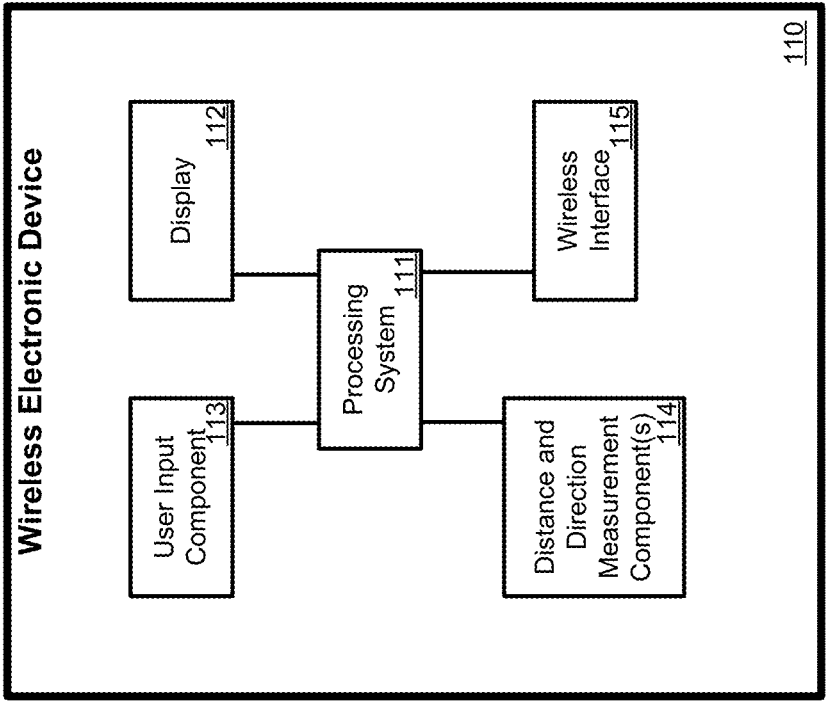
Figure 1:

Further detail regarding such embodiments and other embodiments are presented in relation to the figures. FIG. 1 illustrates an embodiment of a system 100 of electronic devices that can be paired. System 100 includes wireless electronic device 110 ("device 110") and wireless electronic device 120 ("device 120"). Device 110 includes: processing system 111; display 112; user input component 113; one or more distance and direction measuring components 114; and wireless interface 115. All of such components can be housed in a housing of device 110. Generally, any wireless electronic device that can pair with another wireless electronic device can function as wireless electronic device 110. Examples of device 110 can include: smartphones, laptops, gaming devices, desktop computers, personal digital assistants, and smart-home devices (smart home hub devices, smart thermostats, smart home assistants, etc.).

Processing system 111 may include one or more special-purpose or general-purpose processors. Such special-purpose processors may include processors that are specifically designed to perform the functions of the components detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Processing system 111 can be in communication with display 112, user input component 113, distance and direction measurement components 114, and wireless interface 115.

Display 112 can be a graphical electronic display screen capable of presenting color or monochrome graphics. In some embodiments, a simple form of display 112 can be used that includes multiple lights, such as an array of LEDs. Such an array of lights can be used to indicate distance and direction as detailed herein.

User input component 113 can allow a user to provide input to wireless electronic device 110. User input component 113 can be a touchscreen interface incorporated as part of display 112. User input component 113 can be one or more buttons, switches, or possibly an audio interface that receives spoken input.

Distance and direction measurement components 114 may be distinct from or incorporated with wireless interface 115. Distance and direction measurement components 114 are used to determine at least an approximate distance and direction to another wireless device, such as wireless electronic device 120, to which pairing can be performed. In some embodiments, distance and direction measurement components 114 can include wireless interface 115, which can use signal strength as an approximation of distance. In some embodiments, components 114 include an ultra-wideband radar sensor that can be used to determine distance and direction to the wireless device with which pairing is to be performed. In some embodiments, components 114 include a camera that can be used to locate and determine a distance and direction to the wireless device with which pairing is to be performed. In some embodiments, components 114 include a light detection and ranging (LIDAR) sensor that can be used for determining distance and direction to the wireless device with which pairing is to be performed. In some embodiments, components 114 include an ultrasound sensor that can be used for determining distance and direction to the wireless device with which pairing is to be performed. Such an ultrasound sensor can include one or more microphones and an ultrasonic transducer. Various other types of sensors can be used as components 114 to determine a distance and direction to other wireless devices relatively nearby.

Wireless interface 115 can represent the wireless interface for which pairing is to be performed. For example, pairing may be performed for communication via Bluetooth®. Other forms of device-to-device communication protocols that can use such a pairing arrangement detailed herein can include: Bluetooth LE®, ZigBee®, Z-Wave®, 6LoW-PAN®, Thread®, NFC, and WiFi Direct®. Generally, wireless interface 115 can be understood as any short-range device-to-device communication protocol.

Wireless electronic device 120 may have similar components to wireless electronic device 110: processing system 121; display 122; user input component 1232; distance and direction measurement components 124; and wireless interface 125. For example, wireless electronic device 120 may also be any wireless electronic device that can pair with another wireless electronic device. Examples of wireless electronic device 120 can include: smartphones, laptops, gaming devices, desktop computers, personal digital assistants, and smart-home devices (smart home hub devices, smart home assistants, smart carbon monoxide and smoke detectors, smart thermostats, etc.). Alternatively, wireless electronic device 120 may not have all of the components as wireless electronic device 110. For example, wireless electronic device 120 may not have: display 122, user input component 123, and/or distance and direction measurement components 124. Other examples of wireless electronic device 120 can include: wireless headphones, wireless game controllers, wireless speakerphones, wireless speakers, wireless sprinkler controllers, smart home devices (e.g., smart smoke detectors, smart carbon monoxide detectors, smart home speaker devices, smart thermostats, etc.), IoT devices, other forms of headless devices, etc.

Figure 2:
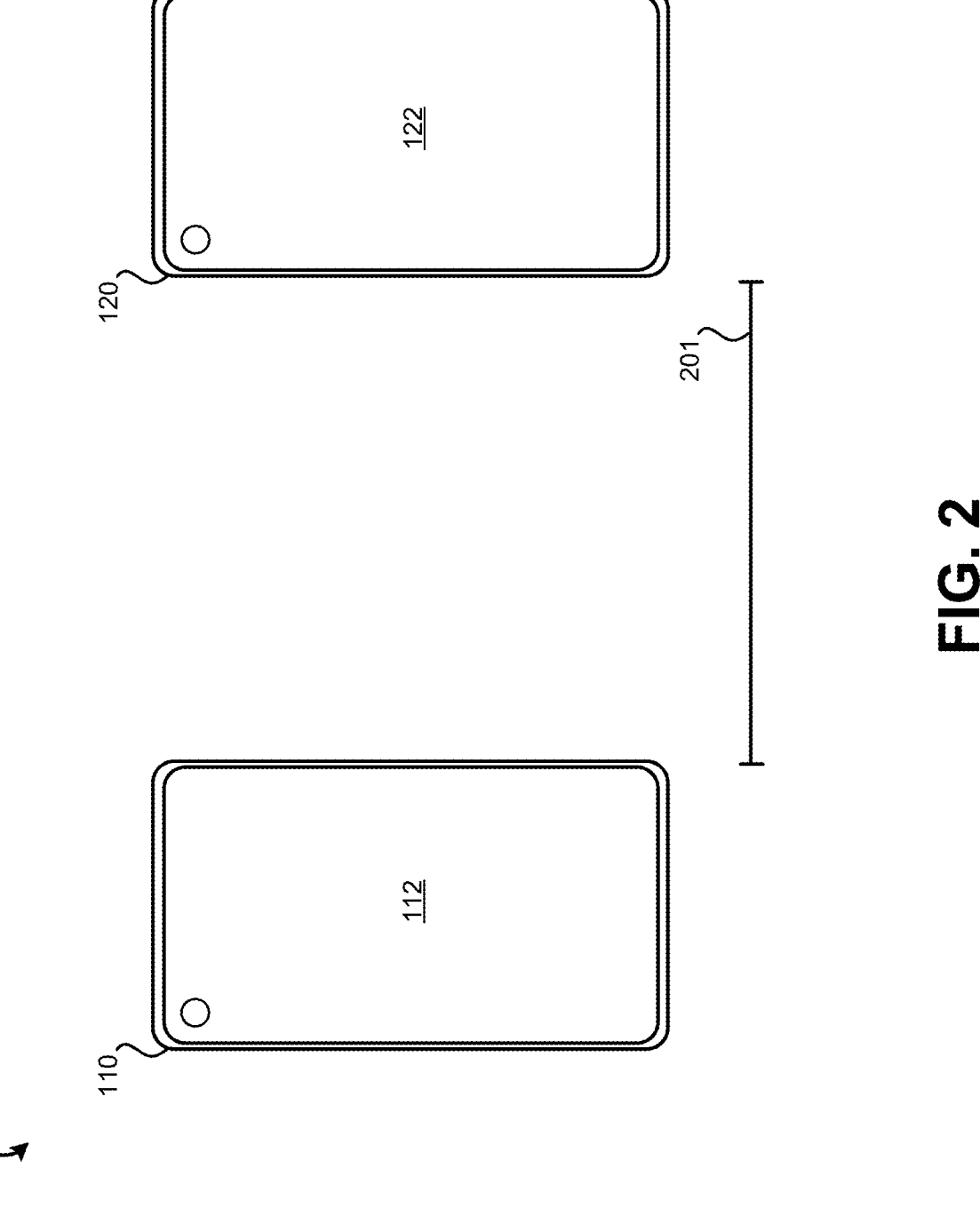
FIG. 2 illustrates two electronic devices that are to be paired.

While FIG. 2 and the subsequent figures are focused on embodiments involving pairing, it should be understood that the embodiment detailed herein can be used to show distance and direction when one or both of the electronic devices are being used for an action other than pairing. For example, a user may desire to use device 110 to locate device 120.

FIG. 2 illustrates an embodiment 200 of two electronic devices that are to be paired. In this example, device 110 is a smartphone and device 120 is also a smartphone. Pairing could be performed in order to establish a communication link, send a file, send a contact card, exchange data, etc. In this example, both device 110 and device 120 have displays (display 112 and display 122, respectively). Initially, device 110, device 120, or both may not yet be set to a pairing mode. Additionally or alternatively, distance 201 may be too great for any indication of pairing to be presented on display 112 or display 122. As such, no graphical indication of distance or direction to the other device is presented on displays 112 and 122.

Figure 3:
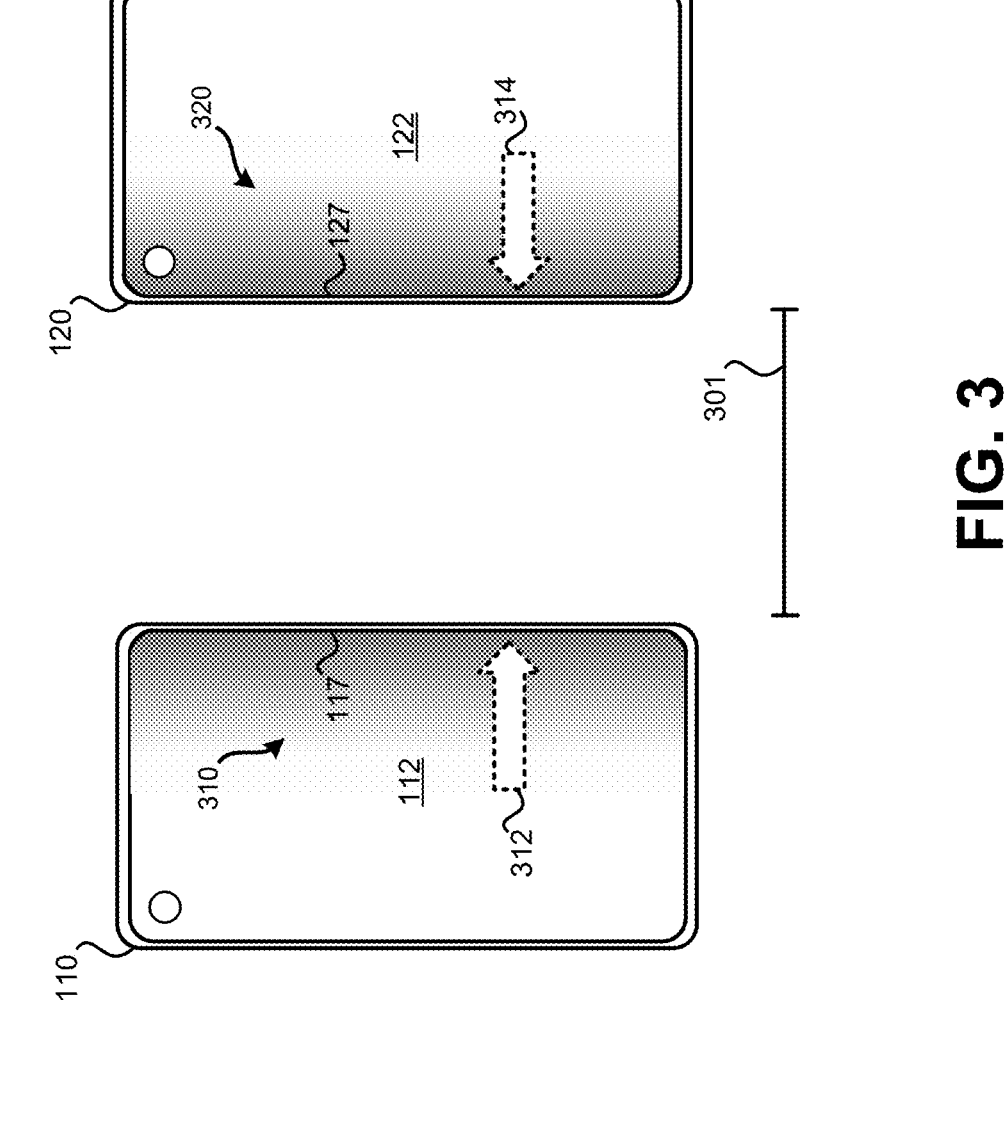
FIG. 3 illustrates the two electronic devices having a pairing mode activated that indicates proximity and direction.

FIG. 3 illustrates an embodiment 300 of device 110 and device 120 having a pairing mode activated that indicates proximity and direction. Device 110 and device 120 may have been set to a pairing mode. Device 110 determines that the nearest device for pairing is device 120 and that device 120 is within a threshold distance. This determination in some embodiments causes a quick pairing mode to be enabled on one or both of the devices. Distance 301 can be understood to be shorter than distance 201. Device 120 may also determine that the nearest device for pairing is device 110 and that device 110 is within the threshold distance. In some embodiments, only a single device, such as device 110, performs the assessment of meeting the criteria for pairing and the other device.

In response to determining that device 120 is eligible for a quick pairing mode, graphical element 310 is presented on display 112. A single graphical element, graphical element 310, can be indicative of both the distance to device 120 and direction to device 120. In the example of FIG. 2, graphical element 310 is a glow effect. The glow effect involves altering the brightness or intensity of the display 112 in steps or a gradient in direction 312. In some embodiments, display 112 is made brighter in the direction of device 120; in some embodiments, display 112 is made darker in the direction opposite of device 120.

When a portion of a display has a glow effect as disclosed herein, that portion of the display may be illuminated with one or more colors instead of, or in addition to, any colors already being displayed. For example, if a phone is on a lock screen when another device is brought into proximity to an edge of the phone, a portion of the display along that edge of the phone may be illuminated with an additional color of light that is superimposed with any lock screen image being displayed (a similar indication may also be presented over any content that is presented by the display other than a lock screen). The glow may be brightest at edge 117 in the case of device 110 with an intensity that decreases proportionally or exponentially with the distance from edge 117. At some distance from the edge of the display closest to the other device, the display may not be altered from the existing image prior to the glow being added.

As a specific example, when a device is within a maximum range, such as 100 cm, 20 cm, 15 cm, 10 cm, 5 cm, or any other desired threshold, a glow may be added to the display along the edge closest to the device, centered at the closest point of the edge to the device. The glow may extend to a first distance from that edge at an initial brightness that decreases at larger distances. Continuing with the specific example, the glow effect may drop to 50% of the initial brightness at 1 cm, 2 cm, 3 cm, 4 cm, 5 cm, or any other desired threshold from the initial brightness which is centered at the edge closest to the other device. The glow effect may be circular, such that the decrease in brightness occurs at any given radius from a point on the edge of the device. As another example, the glow may extend horizontally or vertically across the device from the initial edge, such that the brightness decreases in a gradient along a line perpendicular to the edge closest to the other device. The rate of decrease of the brightness of the glow effect may be linked to the distance between devices. For example, as the devices are brought closer together, the glow may extend at the initial brightness across a larger portion of the display, and/or the rate of decrease of the glow may change based on the distance between the devices. As a specific example, when the devices are separated by a first threshold distance, the glow may extend across 10%, 15%, 20%, or any other desired portion of the display. As the devices are moved closer together, the portion of the display that includes the glow may increase proportionally until the devices are separated by a second distance at which point the glow may extend across 20%, 25%, 30%, or any other desired portion of the display that is larger or smaller than the initial portion, which may be determined as a direct or other relationship to the distance between the devices.

A glow effect may be implemented by increasing the intensity at which pixels are illuminated in the portion of the display in which the glow is to be shown. The increase may be uniform in color such that the glow appears as a white illumination or addition to any image shown on the display, or it may be limited to one or more colors such that the glow appears as a red, green, blue, orange, yellow, or any other color overlay on the existing display or, where no image is shown, on the blank screen. In cases where the illumination is additive to any other image being displayed, the glow may appear semi-transparent. Alternatively, the glow may be shown instead of any preexisting image on the display such that the glow appears to "cover" the preexisting image.

Alternatively, or in addition to additive brightness, a "glow" as disclosed herein may be implemented by dimming regions of the screen other than the region where the glow is displayed. For example, instead of illuminating or increasing the brightness of portions of the display in a circular or linear gradient as previously described, an inverse gradient may be applied to the other portions of the screen such that they are dimmer and, therefore, the glow appears brighter by comparison.

Figure 5:
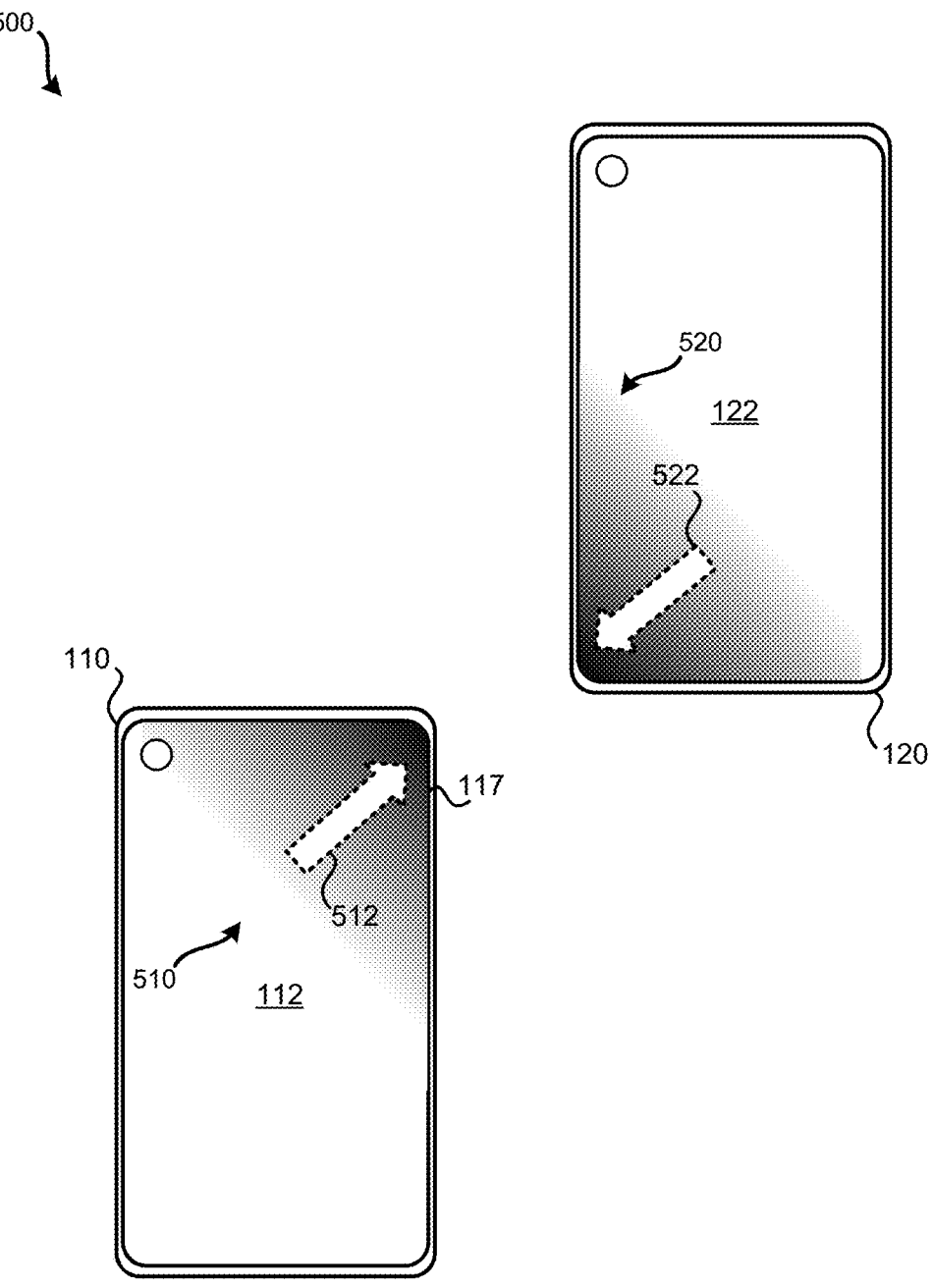
FIG. 5 illustrates the two electronic devices being close together in a different direction and having the pairing mode activated that indicates proximity and direction.

Further, while the example of FIG. 3 illustrates the glow effect originating from a single edge 117 of display 112 of device 110, it should be understood that the glow effect can be strongest or brightest along some or all of two edges to more accurately indicate direction, such as indicated in relation to FIG. 5.

In the example of FIG. 3, distance is indicated by graphical element 310 by the intensity of the glow effect. For example, along display edge 117, which is the closest edge to device 120, the initial intensity of the glow effect can be indicative of a distance to device 120. The greater the intensity, the closer device 120 has been detected.

Similar to device 110, device 120 can perform its own distance and direction measurements to device 110. Based on device 120 also being set to a quick pairing mode, graphical element 320 is presented. Graphical element 320 may have the same or approximately the same intensity, but may indicate the opposite direction 314, which indicates the direction to device 110. Accordingly, the intensity of the glow effect would be strongest on display edge 127 since display edge 127 is closest to device 110. In embodiments in which two devices, such as device 120 and device 110, have graphical displays, a symmetry can be present between the graphical elements: graphical elements 310 and 320 will present the same (or approximately the same) distance indication, and opposite directions, as indicated by directions 312 and 314.

Graphical element 310 being in the form of a glow effect is only one possible way of using a graphical element to indicate both distance and direction. For example, in some embodiments, an arrow may be used that changes in size or color and direction in which it points. Other forms of effects are also possible, such as the alternative glow effect detailed in relation to FIGS. 8 and 9.

Figure 4:
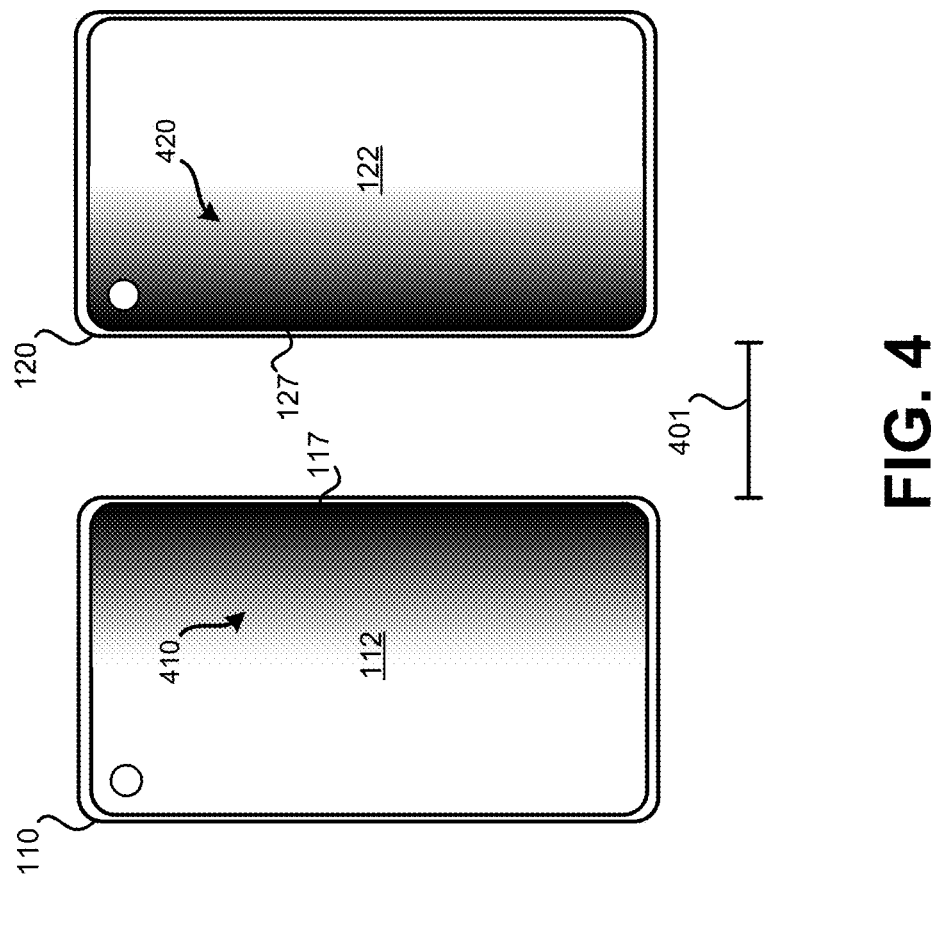
FIG. 4 illustrates the two electronic devices being moved closer together and having the pairing mode activated that indicates proximity and direction.

FIG. 4 illustrates an embodiment 400 of device 110 and device 120 being moved closer together and having the pairing mode activated that indicates proximity and direction. While such an increase (and any corresponding decrease) in the glow is depicted as intensity (e.g., darker/lighter shading) in FIGS. 3-10, this is only for simplicity of the figures. Embodiment 400 represents a similar situation to embodiment 300, but distance 401 is shorter. As such, graphical element 410 and graphical element 420 have changed to indicate the decreased distance, but still indicate the same direction. Graphical element 410 has a more intense glow effect along display edge 117 than graphical element 310 (and a proportionally more intense gradient or proportionally more intense steps across display 112). Similarly graphical element 420 has a more intense glow effect than graphical element 320 along display edge 127 (and a proportionally more intense gradient or proportionally more intense gradient steps across display 122).

While FIG. 4 shows how the graphical element is adjusted based on devices 110 and 120 being moved closer together, the opposite progression of the graphical element may occur if devices 110 and 120 are moved farther apart.

While the differences between FIGS. 3 and 4 illustrated how graphical elements can be modified in response to changes in distance, the direction between device 110 and device 120 was kept constant. FIG. 5 illustrates an embodiment 500 of device 110 and device 120 being close together and having the pairing mode activated but the direction between the devices has changed.

In embodiment 500, graphical element 510 and graphical element 520 maintain the same or approximately the same intensity, but the direction of the graphical elements has changed. The intensity of the glow effect of graphical element 510 is greatest near an upper corner of display. Graphical element 510 forms a gradient that increases in intensity in direction 512. Similarly, the intensity of the glow effect of graphical element 520 is greatest near a lower corner of display 122. Graphical element 520 forms a gradient that increases in intensity in direction 522, which is the direction to device 110.

In other embodiments, as the orientation of the two devices shift relative to each other, the glow effect can track the other device along edges of the device displays such that the brightest or most intense portion of the glow effect points toward the other device, such as indicated by direction 512.

Figure 6:
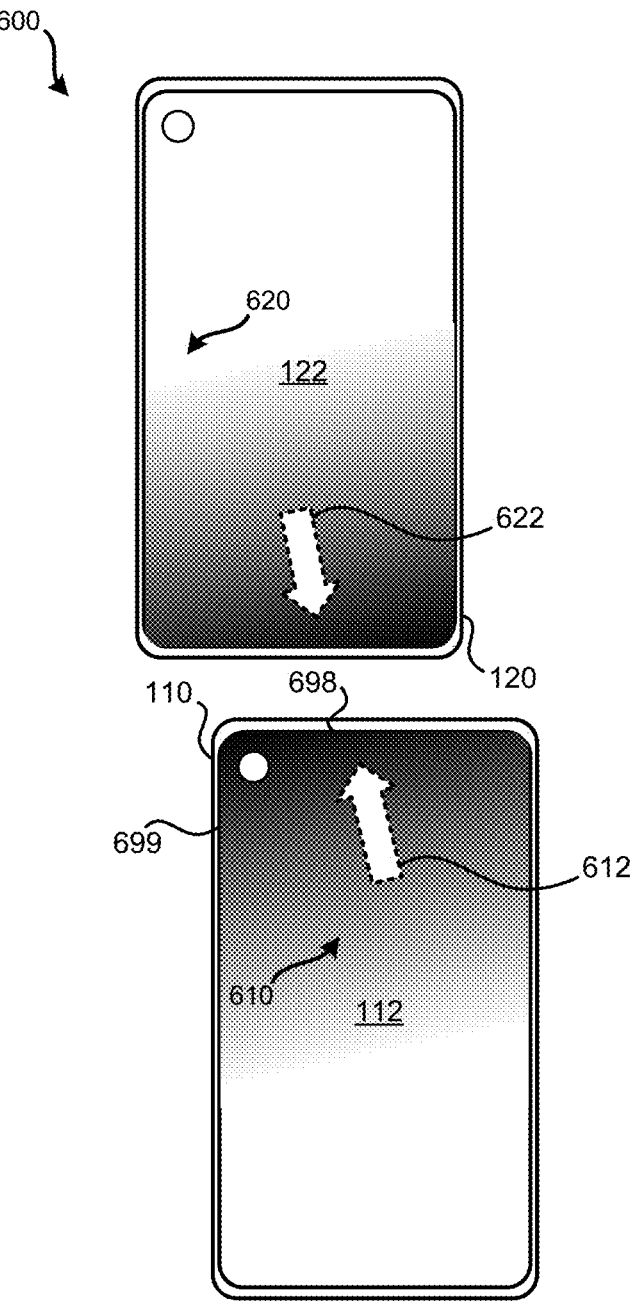
FIG. 6 illustrates the two electronic devices being close together in another direction and having the pairing mode activated that indicates proximity and direction.

As a user moves devices 110 and 120 relative to each other, graphical elements 510 and 520 update to indicate the direction and distance to the other device. FIG. 6 illustrates an embodiment 600 in which device 110 and device 120 are in close proximity, but in a slightly offset direction from each other. In embodiment 600, the glow effect of graphical element 610 is most intense along a top edge 698 of display 112, but is also present along left edge 698 to a lesser degree. This arrangement is indicative that device 120 is mostly above device 110, but offset slightly to the left. The glow effect has an angled gradient to indicate direction 612. Similarly, the glow effect of graphical element 620 is most intense along a bottom edge of display 122. The glow effect has an angled gradient to indicate direction 622.

In the embodiments detailed in FIGS. 3-6, device 110 and device 120 may perform their own distance and direction measurements to the other device. In other embodiments, the measurements are performed using one of the devices and a command is sent to the other device indicating how the graphical element should be presented. For instance, device 110 can send a command to device 120 indicating that graphical element 620 is to be presented and the characteristics of graphical element 620 (e.g., direction, intensity).

Figure 7:
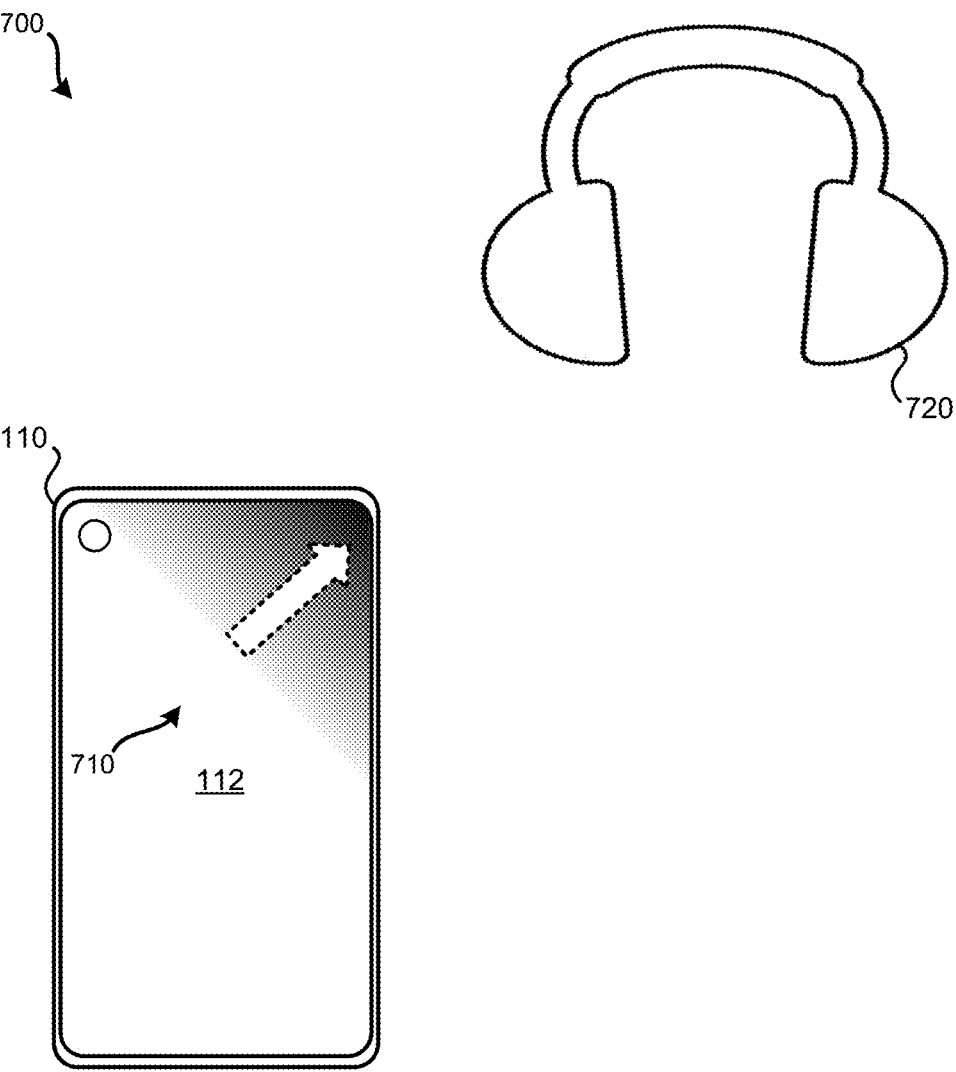
FIG. 7 illustrates an electronic device having a display screen having a pairing mode activated that indicates proximity and direction.

While FIGS. 2-6 focused on arrangements in which both electronic devices have display screens, in other embodiments, only one display screen may be present. FIG. 7 illustrates an embodiment 700 of device 110 having a pairing mode activated that indicates proximity and direction. In embodiment 700, electronic device 720 does not have a display screen. As such, the graphical element indicative of distance and direction is presented only on display 112. However, graphical element 710 is updated as device 110 and electronic device 720 move relative to each other.

Further, in some embodiments, device 110 may not have a display screen. Rather, some other lighting or visual components may be present, such as a single or multi-dimensional array of LEDs or other type of lighting element. For instance, a device may have a circle of lighting elements. Color, intensity, or a blinking/animation pattern of the lighting elements may indicate distance while which lighting element is illuminated on the circle can indicate direction. As an example, a smoke detector with a circular lighting element can indicate direction by illuminating a portion of the circle and distance based on a blinking, animation, color, or intensity of the lighting.

Figure 8:
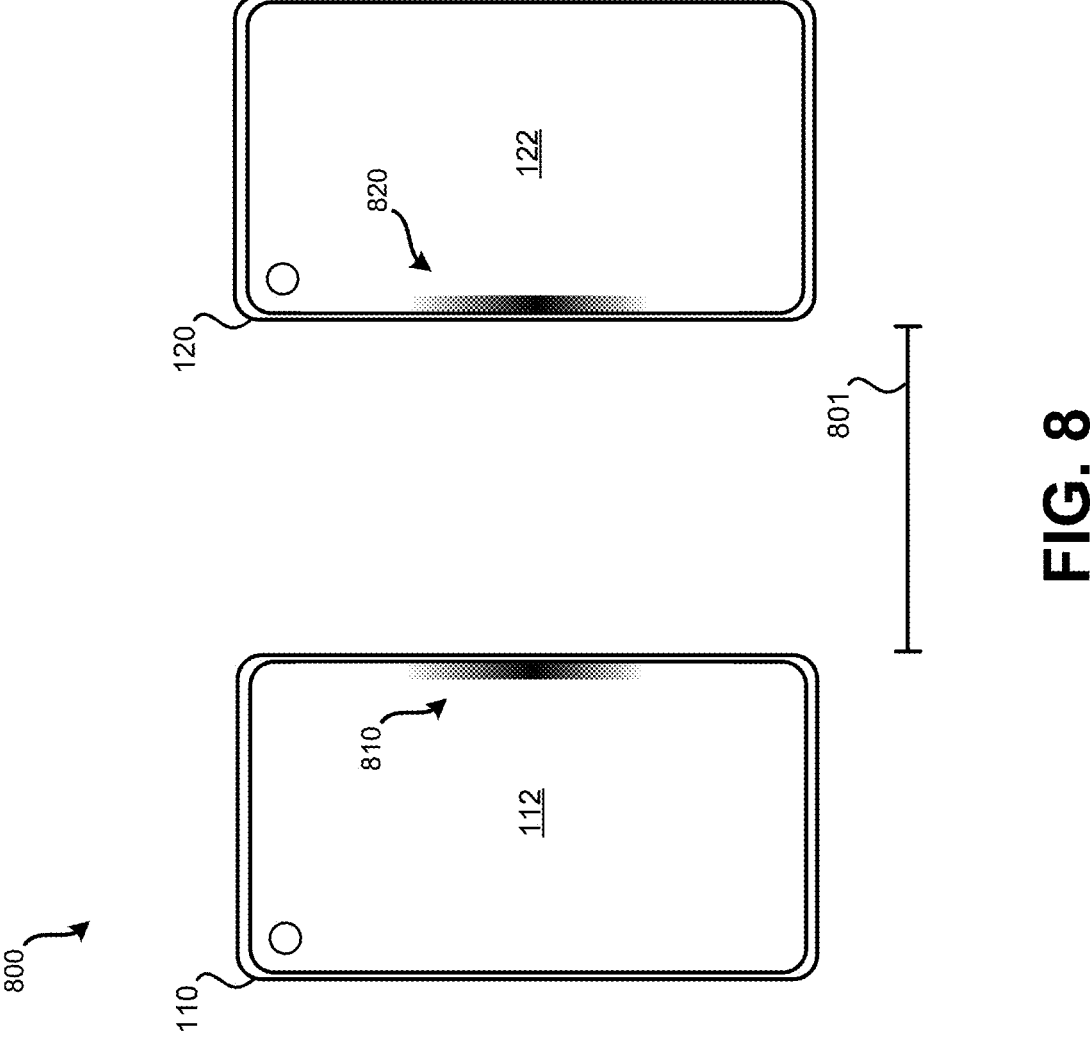
FIG. 8 illustrates another embodiment of two electronic devices having a pairing mode activated that indicates proximity and direction.

FIG. 8 illustrates an embodiment 800 of two electronic devices having a pairing mode activated that indicates proximity and direction. In embodiment 800, a different form of graphical element is arranged along the display edges to indicate proximity and direction. This graphical element is present only within a defined distance of the edge of the display. For example, the graphical element may only extend up to 1%, up to 3%, or up to 5% or 10% of the width or height of the display from the edge of the display. Rather than a glow effect that overlays or alters presentation of content presented on the displays, the linear glow effects of graphical elements 810 and 820 glows a fixed distance from the display edge. That is, the linear glow effect can have a defined pixel width along only one or two edges of the display, with a location of greatest intensity, brightness, or color indicating direction. The center of graphical element 810, which is the location of greatest intensity, may be indicative of direction (by a line being drawn from the center of display 112 through the center of graphical element 810) to device 110. The intensity or size/length of graphical element 810 can be indicative of distance. Graphical element 810 may be color-based or may be a glow effect that alters the presentation of underlying content presented by display 112. Such a glow effect can be achieved by altering the brightness, intensity, and/or colors presented by display 112.

If electronic device 120 has a display as illustrated, a center of graphical element 820 may be indicative of direction (by a line being drawn from the center of display 122 through the center of graphical element 820) to device 110. The intensity and/or length of graphical element 810 can be indicative of distance to the other device, such as device 110. As with graphical element 810, graphical element 820 may be color-based or may be a glow effect that alters the presentation of underlying content presented by display 122.

As with other embodiments of the glow effect, graphical elements 810 and 820 may be symmetrical. That is, graphical elements 810 and 820 may have the same length and/or intensity but be located along one or more edges that are most proximate to the other device to indicate direction. As with the other embodiments of the glow effect, a single graphical element, such as graphical element 810 is used to indicate distance and direction. For example, rather than using two items, such as an arrow and text or two graphical elements, single graphical element 810 indicates both distance and direction.

Figure 9:
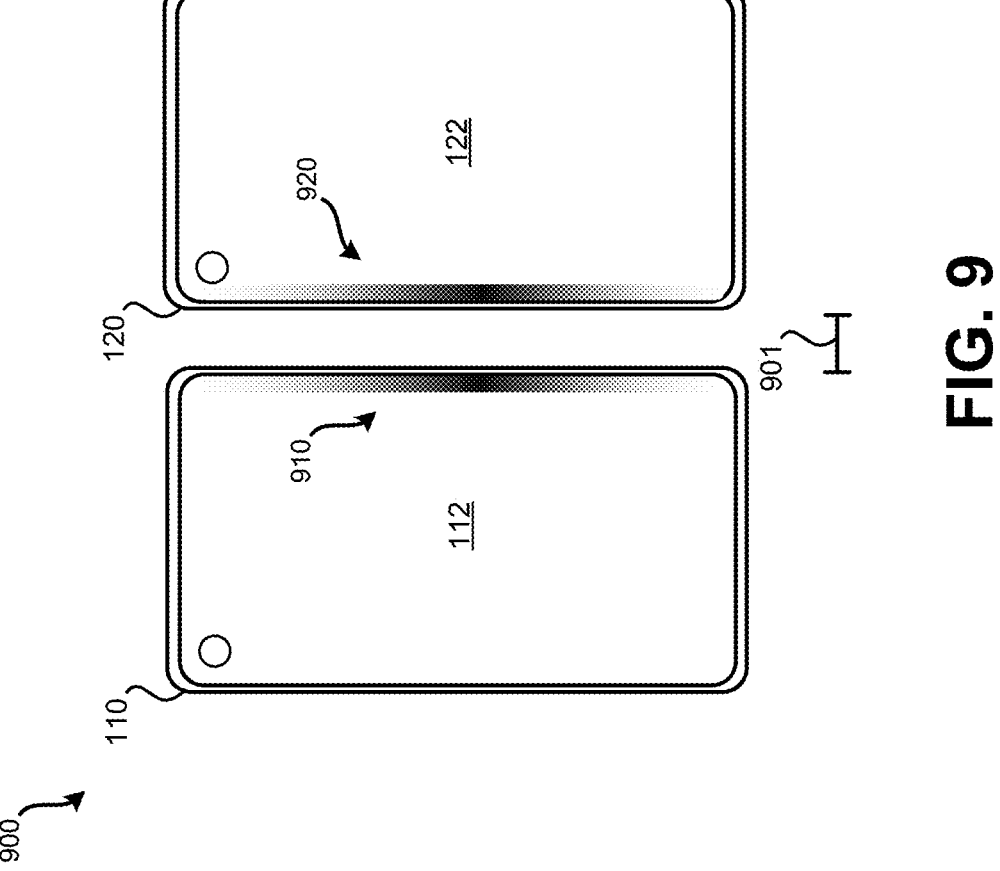
FIG. 9 illustrates another embodiment of two electronic devices being moved closer together having a pairing mode activated that indicates proximity and direction.

As distance 801 is decreased, graphical elements 810 and 820 can be altered to reflect the change in distance. FIG. 9 illustrates embodiment 900 in which the two electronic devices have been moved closer together compared to embodiment 800. As such, distance 901 is smaller than distance 801. Graphical element 910, while maintaining the same location of greatest intensity, can have an overall increased intensity (for a portion or all of graphical element 910) and/or length compared to graphical element 810. This increase in length (in total across the two edges of the display) and/or intensity is indicative of the determined distance to device 120, possibly according to a linear, logarithmic, or exponential distance scale. A symmetrical or nearly symmetrical change is present comparing graphical element 920 to graphical element 820.

Figure 10:
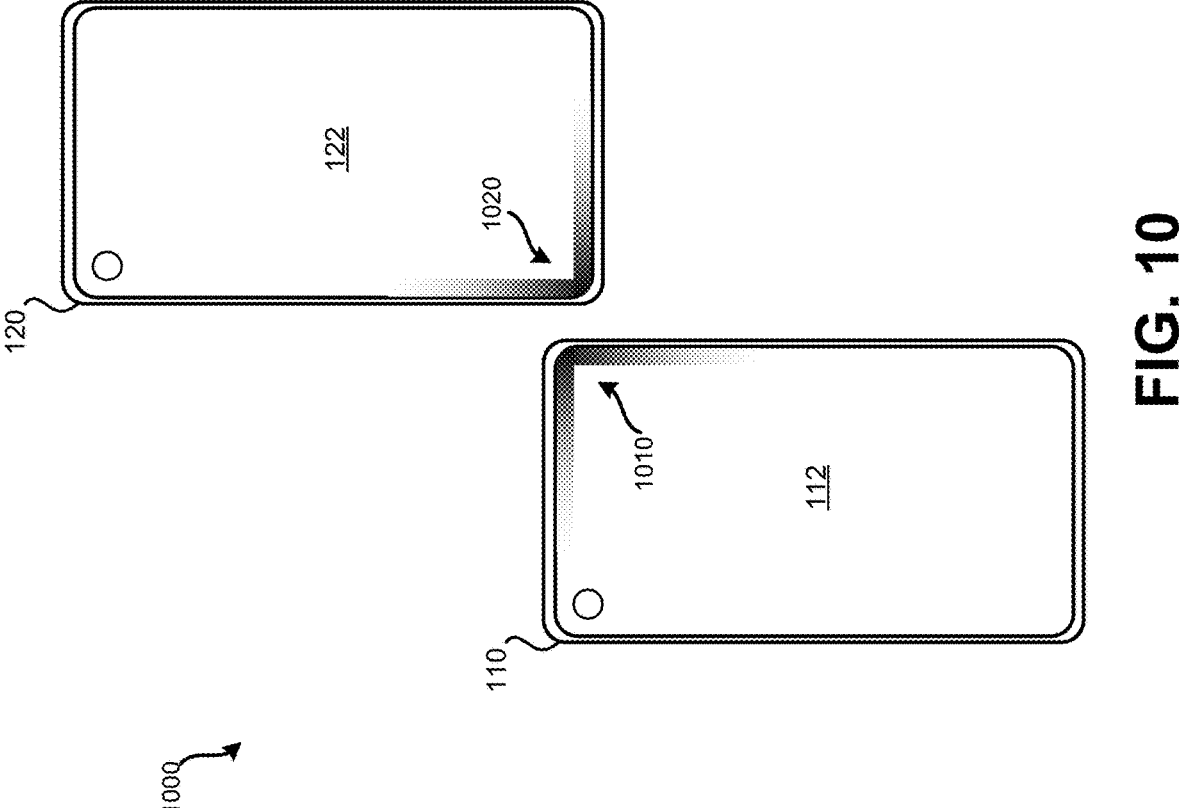
FIG. 10 illustrates another embodiment of two electronic devices being moved closer together having a pairing mode activated that indicates proximity and direction.

Graphical element 910 can extend along multiple edges. FIG. 10 illustrates embodiment 1000 in which the two electronic devices have been positioned at an angle relative to each other. In the illustrated embodiment, when device 110 and device 120 are at an angle to each other, graphical element 1010 may be arranged along a top edge and a side edge of display 112. Similarly, graphical element 1020 may be arranged along a bottom edge and a side edge of display 1222.

Figure 11:
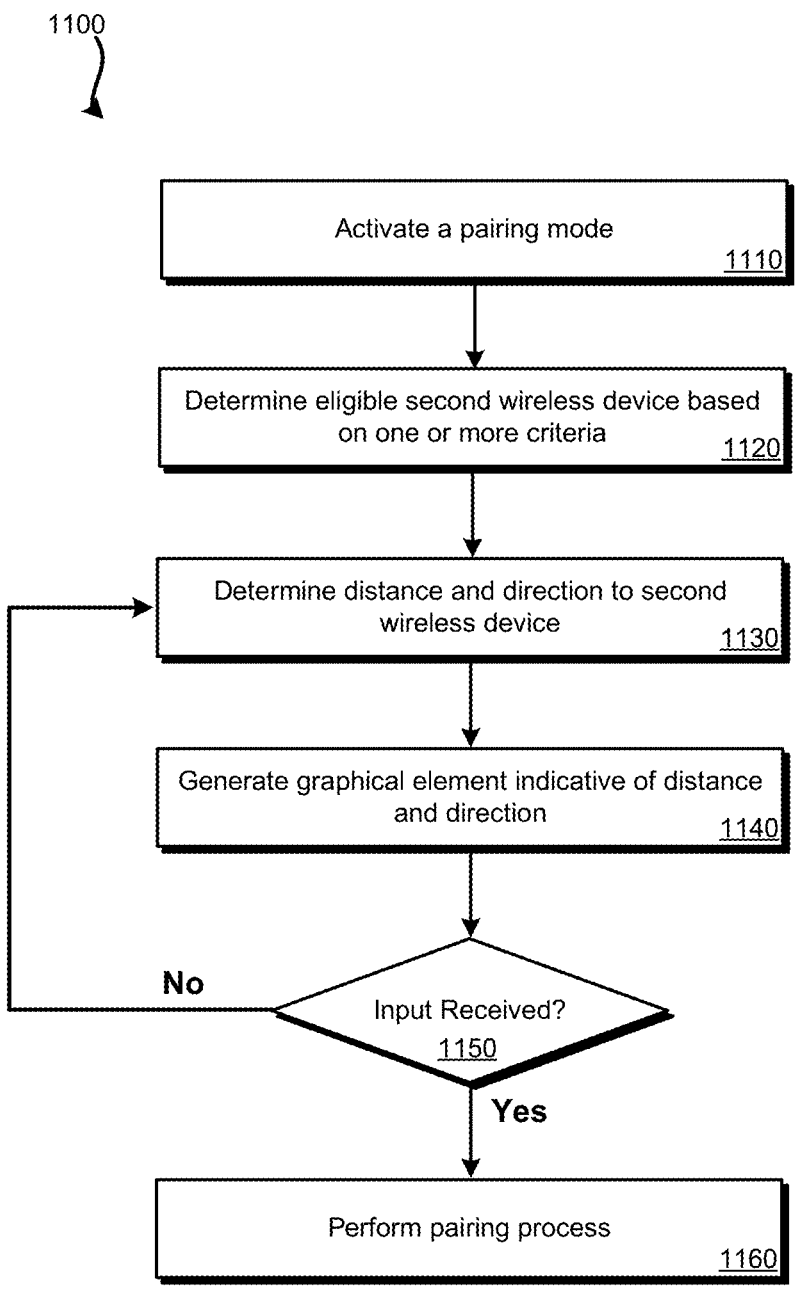
FIG. 11 illustrates an embodiment of a method for indicating direction and distance for a pairing mode to establish a link between two electronic devices.

Various methods may be performed using the systems, devices, and arrangements detailed in relation to FIGS. 1-10. FIG. 11 illustrates an embodiment of a method 1100 for indicating direction and distance for a pairing mode to establish a link between two electronic devices. Alternatively, method 1100 can be performed for tasks other than pairing, such as for locating an electronic device. Method 1100 can be performed using one or both of the wireless electronic devices of system 100 of FIG. 1.

At block 1110, a quick pairing mode may be activated on a first wireless electronic device (the "first device"). In some embodiments, pairing mode is activated based on user input, such as a user indicating that another device is to be sent a file, stream media, or a communication link is to be established with another wireless electronic device. In other embodiments, the quick pairing mode can be activated by the first device without direct user input in response to detecting an eligible second wireless electronic device (the "second device") at block 1120. For example, a user may move the first device and the second device into proximity, which leads to the first device entering the pairing mode.

At block 1120, the first device may determine whether a wireless device is eligible for quick pairing based on one or more criteria. A first distance-based threshold criterion may be that the second device is detected to be within a maximum predefined distance for quick pairing. For example, a distance of less than a predefined value in the range of 5-50 cm may be the maximum distance with which quick pairing is permitted to help ensure that pairing occurs only when the user is likely to desire it. A second distance-based threshold criterion may be that the second device is the closest available device for pairing. For instance, two devices may be located close to the first device. The device determined to be closest to the first device may be identified as the device to be paired. (For example, on an airplane, this situation may arise when the first device is in close proximity to many other wireless devices.) Other criteria that can involve determining that the second device is eligible can include: the second device having pairing enabled, the second device being of a type that can be paired with the first device, the second device being powered on and having a sufficient charge to permit pairing, etc. For the remainder of method 1100, it is assumed that the second device was found eligible for pairing at block 1120.

At block 1130, since the second device has been determined to be eligible, a graphical indication of distance and direction to the second device is determined by the first device. As detailed in relation to system 100, there are various ways in which the distance and direction can be determined by the first device to the second device, including signal strength, UWB, LIDAR, ultrasound, radar, object recognition (e.g., via a camera of the first device), GPS, etc.

At block 1140, the graphical indication of direction and distance can be presented on a display (or other lighting arrangement) of the first device. As previously detailed and illustrated, the graphical element may use a glow effect that uses a stepped or gradient of brightness, intensity, or color to indicate a direction (along the gradient) and distance (intensity or brightness of the glow effect). If a glow effect is used, the glow effect may be layered on top of other content presented by the display of the first device.

In some embodiments, a characteristic of the graphical element is based at least in part on the identifier of the other device and/or a previous relationship of the two devices. For example, if the second device is a known device, such as a previously paired device, a color of the glow may be selected (e.g., green). Alternatively, if the second device is unknown, such as not previously paired, the color of the graphical element may be different, such as red. Alternatively, or in addition, the graphical element may change, for example, from a solid animation to a pulsating animation and/or a frequency of the animation may be altered.

When the user sees the graphical element, the user can use the graphical element to determine whether the device desired by the user for pairing has in fact been identified by the first device for pairing. If the graphical elements point in the direction of the user's desired device for pairing with an appropriate indication of distance, the user can safely assume the correct device has been identified. If so, the user can provide input at block 1150, such as a touch input or swipe, to indicate that the pairing should be completed. If the wrong device has been identified, the user would see an unexpected graphical indication of distance and direction. The user can then provide input at block 1150 canceling the pairing.

The user may move the first and second devices relative to each other to ensure that the graphical elements update, remain pointed at each other, and properly reflect changes in distance between the devices. Therefore, as the devices are moved closer and farther apart, the graphical element updates to indicate these positive and negative changes in distance. Updating also includes adjusting the direction in which the graphical element points. These updates can assure the user that the correct devices are to be paired. If no input is received at block 1150, at least for a time, the distance and direction to the second wireless device at block 1130 may be measured or otherwise determined again. At block 1140, the graphical element is updated with any changes to the distance and direction of the second device. From the perspective of the user, it may appear that the graphical element presented by the display of the first device is continuously updating based on the distance and direction to the second device.

Blocks 1110 through 1140 may also be performed concurrently by the second device. Therefore, if the second device has a display, the display of the second device is also presenting a graphical element that is updated to indicate the distance and direction to the first device. This second graphical element further helps the user ensure that the correct two devices have been identified and will be paired.

Assuming the second device was correct and the user desired to pair the first and second devices, pairing can be performed at block 1160. This can involve data being exchanged directly between the two devices wirelessly or through a wireless network allowing the two devices to have a communication link that can be used to exchange data, such as Bluetooth pairing. In some embodiments, this pairing can involve a one-time or ad hoc data exchange, such as a link, identifier, file, or other data being sent from the first device to the second device. In various embodiments, pairing can involve the first device launching an application, opening a file, and/or performing some other action based at least in part of the identifier and/or the relationship with the second device. For example, if the first device is a tablet computer and the second device is a smartphone on which a user is composing an email, the tablet computer may launch an email application with a copy of the email in response to pairing.

In some embodiments, in addition to a graphical element, audio can be output by the first and/or second device via one or more speakers or an audio output component (such as a headphone jack or wireless headphone interface). The audio may change in tone or volume based on distance and direction between the two devices. If the first device is capable of stereo output, the direction may affect the stereo effect output.

Notably, to perform the quick pairing process of method 1100, the user does not need to be aware of the identifiers of either the first or second device. Rather, by watching the graphical element presented by the first device and, possibly, the second device, the user can confirm that the proper two devices are to be paired.

Figure 12:
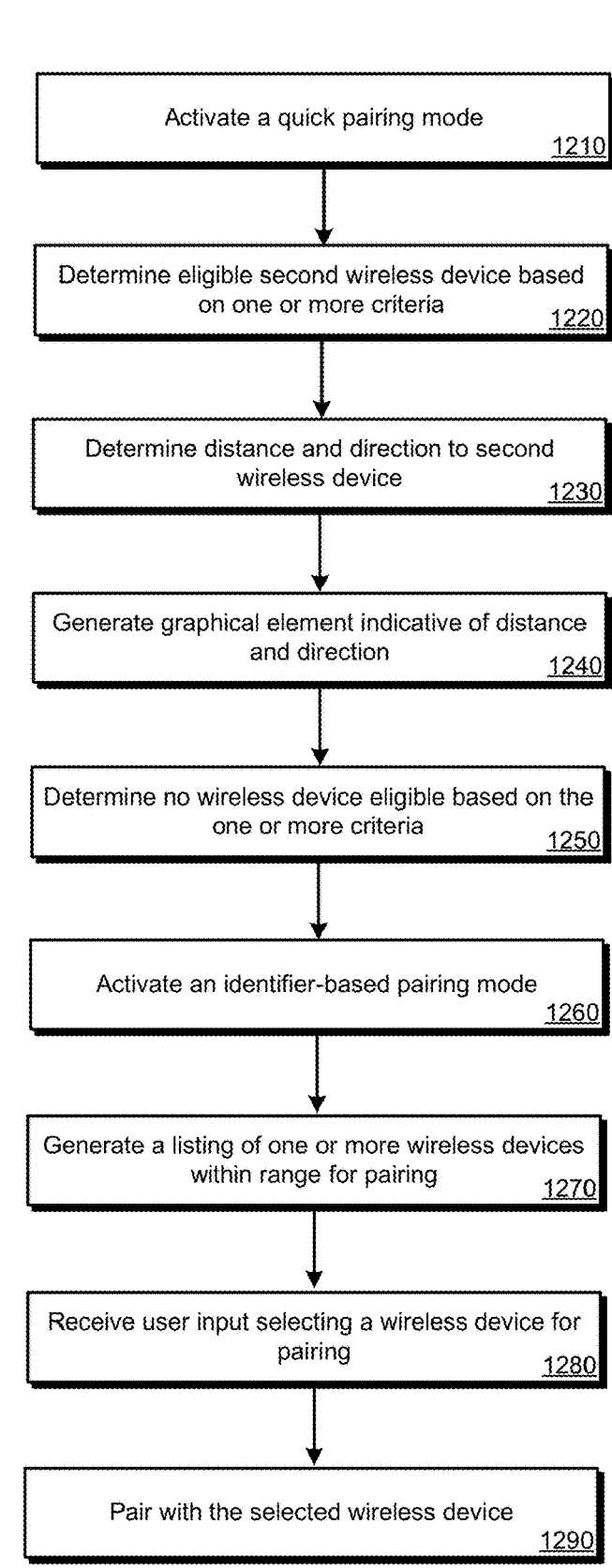
FIG. 12 illustrates an embodiment of a method for using multiple pairing modes for establishing a link between two electronic devices.

In addition to the quick pairing mode detailed in method 1100, another pairing mode may be available that allows for a user to perform pairing based on an identifier. FIG. 12 illustrates an embodiment of a method 1200 for using multiple pairing modes for establishing a link between two electronic devices. Method 1200 can be performed using one or both of the wireless electronic devices of system 100 of FIG. 1.

Blocks 1210-1240 may be performed as detailed in relation to method 1100. That is, a user can activate a quick pairing mode or the first device may activate the quick pairing mode based on determining that another nearby device meets all of the necessary criteria.

As part of the same pairing process or at a different time, a determination may be made that no wireless device is eligible for quick pairing based on the one or more criteria at block 1250, such as distance, capabilities, etc. In such an instance, an identifier-based pairing mode may be activated at block 1260.

In the identifier-based pairing mode, a listing of available wireless devices, which can be one or more, may be generated at block 1270. The listing can list each available wireless device by identifier, which may be a default identifier or may have been user-assigned. The criteria for being included in the listing may be less stringent than for the quick pairing mode. That is, there may not be a maximum distance requirement and/or the wireless devices do not necessarily need to be the closest device to the first device.

From the listing, the user can provide user input selecting the device with which pairing is desired. At block 1280, the first device receives the user input selecting the wireless device for pairing based on the identifier while in the identifier-based pairing mode. Pairing can be performed at block 1290. This can involve data being exchanged directly between the two devices wirelessly or through a wireless network allowing the two devices to have a communication link that can be used to exchange data, such as Bluetooth pairing. In some embodiments, this pairing can involve a one-time or ad hoc data exchange, such as a link, identifier, file, or other data being sent from the first device to the second device.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known processes, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for establishing a link between two electronic devices, the method comprising:

activating, by a first wireless electronic device, a pairing mode to establish the link;

determining, by the first electronic wireless device, that a distance to a second wireless electronic device meets a distance threshold criterion; and in response to the pairing mode being activated and the distance to the second wireless electronic device meeting the distance threshold criterion, superimposing, via an electronic display of the first wireless electronic device presenting digital content, a graphic element comprising a glowing effect indicative of direction and distance to the second wireless electronic device over the digital content, wherein the glowing effect is positioned at a portion of the display corresponding to the relative position of the second wireless device.

2. The method for establishing the link between two electronic devices of claim 1, further comprising:

activating, by the second wireless electronic device, the pairing mode to establish the link with the first wireless electronic device;

determining, by the second electronic wireless device, that the distance to the first wireless electronic device meets the distance threshold criterion; and in response to the pairing mode being activated at the second wireless electronic device and the distance to the first wireless electronic device meeting the distance threshold criterion, presenting, via a second electronic display of the second wireless electronic device, a second graphic element indicative of a second direction and a second distance to the first wireless electronic device, such that the second graphical element is presented concurrently with the graphical element presented by the electronic display of the first wireless electronic device.

3. The method for establishing the link between two electronic devices of claim 2, further comprising:

while presenting, via the electronic display of the first wireless electronic device, the graphical element indicative of direction and distance to the second wireless electronic device, receiving, by the first wireless electronic device, user input indicative that pairing with the second wireless electronic device is to be performed; and in response to the user input, pairing, by the first wireless electronic device, with the second wireless electronic device.

4. The method for establishing the link between two electronic devices of claim 1, wherein the glowing effect is presented only within a defined distance of an edge of the electronic display of the first wireless electronic device.

5. The method for establishing the link between two electronic devices of claim 1, further comprising:

selecting, by the first wireless electronic device, the second wireless electronic device for pairing while in the pairing mode without user input indicating an identifier of the second wireless electronic device.

6. The method for establishing the link between two electronic devices of claim 1, further comprising:

updating, by the first electronic wireless device, the graphical element indicative of direction and distance to the second wireless electronic device based on a change in the distance, the direction, or both to the second wireless electronic device.

7. The method for establishing the link between two electronic devices of claim 6, wherein updating the graphical element indicative of direction and distance to the second wireless electronic device comprises altering one or more of the following characteristics of the graphical element: intensity; brightness; size; and color.

8. The method for establishing the link between two electronic devices of claim 1, further comprising:

measuring, by the first wireless electronic device, the distance to the second wireless electronic device using a method selected from the group consisting of: ultra-wideband (UWB) radar; light detection and ranging (LIDAR); signal strength; and ultrasonic sound.

9. The method for establishing the link between two electronic devices of claim 1, further comprising:

determining, by the first electronic wireless device, that a second distance to a third wireless electronic device does not meet the distance threshold criterion; and in response to the pairing mode being activated and the distance to the third wireless electronic device not meeting the distance threshold criterion, presenting, via the electronic display of the first wireless electronic device, a listing of identifiers that includes an identifier of the third wireless electronic device.

10. A system for pairing electronic devices, the system comprising:

a first wireless electronic device, comprising:

a housing;

an electronic display housed by the housing;

a wireless communication interface housed by the housing; and a processing system, comprising one or more processors, configured to:

activate a pairing mode;

determine that a distance to a second wireless electronic device meets a distance threshold criterion; and in response to the pairing mode being activated and the distance to the second wireless electronic device meeting the distance threshold criterion, superimpose on the electronic display presenting digital content a graphic element comprising a glowing effect indicative of direction and distance to the second wireless electronic device over the digital content, wherein the glowing effect is positioned at a portion of the display corresponding to the relative position of the second wireless device.

11. The system of claim 10, further comprising:

the second wireless electronic device, comprising:

a second housing;

a second electronic display housed by the second housing;

a second wireless communication interface housed by the second housing; and a second processing system, comprising one or more processors, configured to:

activate the pairing mode;

determine that the distance to the first wireless electronic device meets the distance threshold criterion; and in response to the pairing mode being activated at the second wireless electronic device and the distance to the first wireless electronic device meeting the distance threshold criterion, cause the second electronic display to present a second graphic element indicative of direction and distance to the first wireless electronic device, such that the second graphical element is presented concurrently with the graphical element presented by the electronic display of the first wireless electronic device.

12. The system of claim 10, further comprising:

the second wireless electronic device, comprising:

a second wireless communication interface housed by the second housing; and a second processing system, comprising one or more processors, wherein the second wireless electronic device does not include an electronic display.

13. The system of claim 10, wherein the processing system of the first wireless electronic device is further configured to:

while the graphical element indicative of direction and distance to the second wireless electronic device is being presented, receive user input indicative that pairing with the second wireless electronic device is to be performed; and in response to the user input, pair with the second wireless electronic device.

14. The system of claim 10, wherein the glowing effect is presented within only a defined distance of an edge of the electronic display of the first wireless electronic device.

15. The system of claim 10, wherein the processing system of the first wireless electronic device is configured to select the second wireless electronic device for pairing while in the pairing mode without user input indicating an identifier of the second wireless electronic device.

16. The system of claim 10, wherein the processing system of the first wireless electronic device is configured to update the graphical element indicative of direction and distance to the second wireless electronic device based on a change in the distance, the direction, or both to the second wireless electronic device.

17. The system of claim 16, wherein the processing system of the first wireless electronic device being configured to update the graphical element indicative of direction and distance to the second wireless electronic device comprises the processing system being configured to alter one or more of the following characteristics of the graphical element: intensity; brightness; size; and color.

18. The system of claim 10, wherein the processing system of the first wireless electronic device is configured to receive the distance to the second wireless electronic device measured using a method selected from the group consisting of: ultra-wideband (UWB) radar; light detection and ranging (LIDAR); signal strength; and ultrasonic sound.

\* \* \* \* \*